_United States Patent_ [19]

Lunder et al.

[11] 4,357,361

[45] Nov. 2, 1982

[54] COLD SOLUBLE TEA

[75] Inventors: Tito L. Lunder; Corine M. Nielsen, both of Lausanne, Switzerland

[73] Assignee: Societe d'Assistance Technique pour Produits Nestle S.A., Lausanne, Switzerland

[21] Appl. No.: 272,668

[22] Filed: Jun. 11, 1981

[51] Int. Cl.³ .......................... A23F 3/40; A23F 3/22
[52] U.S. Cl. ................................ 426/597; 426/435
[58] Field of Search .............................. 426/435, 597

[56] References Cited

U.S. PATENT DOCUMENTS 2,785,979  3/1957  Mitchell .............................. 426/597

4,154,864  5/1979  Risler et al. ...................... 426/597 X

_Primary Examiner_—Joseph M. Golian
_Attorney, Agent, or Firm_—Vogt & O'Donnell

[57] ABSTRACT

A process for the preparation of a powdered black tea extract which comprises contacting black tea leaves with water which has previously been infused at ambient temperature with another vegetable material, maintaining at ambient temperature for a time sufficient to achieve good contact of the tea leaves with the water, heating to a temperature of at least 60° C., afterwards separating the aqueous extract from the solid material and finally drying the aqueous extract.

7 Claims, No Drawings

COLD SOLUBLE TEA

The present invention relates to an improved process for the preparation of a soluble tea extract and more particularly to a powdered tea extract which is readily and completely soluble in cold water.

During the production of powdered tea extracts, certain substances are extracted from the tea leaves which are insoluble in cold water and result in a cloudy formation when the extract is added to cold water. Although these substances may be removed by cooling the hot aqueous tea extract to precipitate them, there is a loss of up to about 10% of the total tea solids if the precipitated portion is then discarded, thus leading to a substantial loss of normal flavouring components. On the other hand, powdered tea extracts which have been solubilised by a chemical treatment give a reconstituted beverage which is very foamy and has exceedingly poor stability, palatability and drinking qualities.

We have found, surprisingly, that black tea can be naturally solubilised by a very simple process which comprises extracting tea leaves with water in which another vegetable material has been previously infused.

Accordingly, the present invention provides a process for the preparation of a powdered black tea extract which comprises contacting black tea leaves with water which has previously been infused at ambient temperature with another vegetable material, maintaining at ambient temperature for a time sufficient to achieve good contact of the tea leaves with the water, heating to a temperature of at least 60° C., afterwards separating the aqueous extract from the solid material and finally drying the aqueous extract.

The process of this invention is applicable to any kind of black tea or to any blend thereof.

The vegetable material, which is used to infuse the water before addition of the black tea, is preferably a herb tea, especially one normally associated with tea in instant drinks, for example, Hibiscus flowers, Rosehips, Peppermint and Orange blossoms.

The amount of vegetable material used for the infusion is conveniently from 5% to 35% by weight and preferably from 10% to 30% by weight based on the weight of the black tea used for the extraction.

The period of time of the infusion of the vegetable material into the water is conveniently at least 5 minutes and preferably from 10 to 40 minutes. Longer periods of time are possible but are usually unnecessary. The infusion may be carried out batchwise or countercurrently. In a batchwise process the vegetable material is preferably agitated in the water, for instance by stirring, while in a countercurrent process the water conveniently flows countercurrently through a plurality of cells containing the vegetable material.

By ambient temperature in this invention we mean any temperature occuring in normal circumstances in the surrounding environment, for example, from 10° C. to 40° C., preferably from 15° C. to 30° C. and especially from 20° C. to 25° C. This applies both when the infusion of the water with the vegetable material takes place and when the black tea is added to the water which has previously been infused with the vegetable material.

The period of time for which the black tea leaves are maintained at ambient temperature in the water which has previously been infused, is conveniently at least 5 minutes and preferably from 10 to 40 minutes. Longer periods of time are possible but are usually unnecessary.

The contact of the black tea leaves with the infused water may be carried out batchwise or countercurrently. In a batchwise process the black tea leaves may conveniently be added to the vessel which contains the infused water and the vegetable material, while in a countercurrent process the infused water conveniently flows countercurrently through a plurality of cells containing black tea leaves.

After the black tea leaves and the infused water have been maintained at ambient temperature for a suitable period of time, they are preferably heated rapidly to the desired temperature and advantageously maintained at this temperature for a period of from 1 to 10 minutes, especially from 2.5 to 7.5 minutes. Longer periods of time are possible but are usually unnecessary. The temperature to which they are heated is preferably at least 80° C. and especially from 90° C. to 100° C. If the contact of the black tea leaves with the infused water takes place batchwise the temperature may be raised in the vessel containing the mixture preferably with agitation such as stirring. If the contact of the black tea leaves with the infused water takes place countercurrently, the aqueous extract conveniently flows out of the cells at ambient temperature and then countercurrently at the appropriate elevated temperature through a plurality of cells containing black tea leaves which have previously been contacted with infused water at ambient temperature.

After the heat treatment the manner of the separation of the aqueous extract from the solid material depends on whether the process is batchwise or countercurrent. If the contact of the black tea leaves with the infused water is carried out batchwise the separation of the aqueous extract from the solid material may conveniently be achieved by filtration whereas if the contact takes place countercurrently, the separation may be achieved by drawing off the aqueous extract from the cell containing the least exhausted black tea leaves.

If desired the aqueous extract may be concentrated to a suitable solids content before drying. The powdered extract may be obtained by freeze-drying or spray-drying.

The powdered extract may be mixed with any of the ingredients usually employed in tea preparations, for instance, sucrose, glucose, citric acid, tartaric acid, sodium citrate, flavours or anti-caking agents. If desired, volatiles may be removed from the black tea leaves before extraction, for example, by steam distillation and afterwards reincorporated into the powdered extract.

The powdered extract obtained in accordance with the present invention is instantly soluble in cold water and provides beverages having good stability, palatability and drinking qualities.

The following Examples further illustrate the present invention.

EXAMPLE 1

10 g of Hibiscus flowers were added to 1000 ml of cold tap water and stirred for 30 minutes at room temperature. 40 g of black tea were poured into the cold Hibiscus infusion and stirred for a further 30 minutes at room temperature. The mixture was then heated rapidly to 95° C. and maintained at this temperature for 5 minutes. Afterwards the mixture was filtered and the extract was concentrated before being spray-dried. A light pink coloured powder was obtained which was instantly soluble in cold water.

EXAMPLE 2

By following a similar procedure to that described in Example 1 but using 5 g of Hibiscus flowers instead of 10 g used therein, and 45 g of black tea instead of 40 g used therein, a light pink coloured powder was obtained which was instantly soluble in cold water.

EXAMPLE 3

By following a similar procedure to that described in Example 1 but in which the Hibiscus flowers were stirred in the water for 15 minutes instead of 30 minutes, a light pink coloured powder was obtained which was instantly soluble in cold water.

EXAMPLE 4

By following a similar procedure to that described in Example 1 but using 10 g of Rosehips instead of the Hibiscus flowers used therein, a powder was obtained which was instantly soluble in cold water.

EXAMPLE 5

By following a similar procedure to that described in Example 1 but using 10 g of Peppermint instead of the Hibiscus flowers used therein, a powder was obtained which was instantly soluble in cold water.

EXAMPLE 6

By following a similar procedure to that described in Example 1 but using 10 g Orange blossoms instead of the Hibiscus flowers used therein, a powder was obtained which was instantly soluble in cold water.

We claim:

1. A process for the preparation of a powdered black tea extract which is readily and completely soluble in cold water which comprises:
   (a) contacting herb tea selected from the group consisting of Hibiscus flowers, Rosehips, Peppermint and Orange blossoms with water at ambient temperature for a period of at least 5 minutes to form an infusion;
   (b) separating the infusion from the herb tea;
   (c) adding the herb tea infusion to black tea leaves at ambient temperature for a period of time sufficient to achieve good contact of the tea leaves with the water to form an aqueous tea extract/tea leaf mixture;
   (d) heating the mixture to a temperature of at least 60° C.;
   (e) separating the aqueous tea extract from the extracted black tea leaves; and then
   (f) drying the aqueous extract;
   wherein the amount of herb tea employed in step (a) is from 5 to 35% by weight based on the weight of black tea employed in step (c).

2. A process according to claim 1 in which the amount of herb tea employed is from 10% to 30% by weight based on the weight of the black tea used for the extraction.

3. A process according to claim 1 in which the period of time for the infusion of the herb tea into the water is from 10 to 40 minutes.

4. A process according to claim 1 in which the black tea leaves are in contact with the herb tea infusion at ambient temperature for a period of from 10 to 40 minutes.

5. A process according to claim 1 in which the black tea leaves and infused water are heated to a temperature of from 90° C. to 100° C.

6. A process according to claim 1 in which the black tea leaves and infused water are maintained at the temperature of at least 60° C. for a period of from 2.5 to 7.5 minutes.

7. A powdered black tea extract prepared by a process according to claim 1.

* * * * *